UNITED STATES PATENT OFFICE.

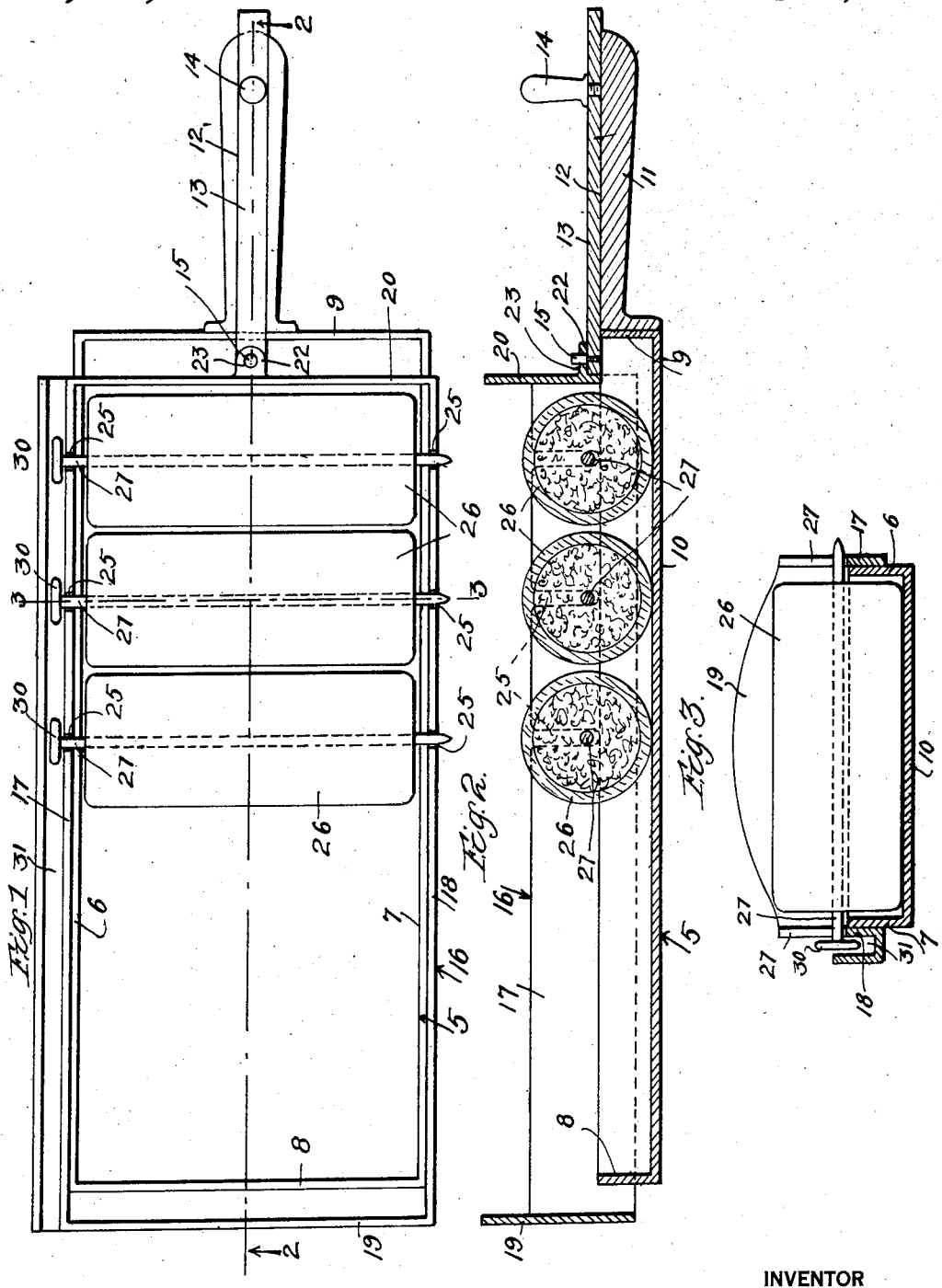
F. J. T. O'BRIEN.
GRIDDLE.
APPLICATION FILED FEB. 7, 1920.
1,391,269.
Patented Sept. 20, 1921.
INVENTOR
Francis J. T. O'Brien
BY
Edward A. Strauss
ATTORNEY

FRANCIS J. T. O'BRIEN, OF LOS ANGELES, CALIFORNIA.

GRIDDLE.

1,391,269.   Specification of Letters Patent.   Patented Sept. 20, 1921.

Application filed February 7, 1920. Serial No. 356,910.

*To all whom it may concern:*

Be it known that I, FRANCIS J. T. O'BRIEN, a citizen of the United States, residing at Los Angeles, in the county of Los Angeles and State of California, have invented new and useful Improvements in Griddles, of which the following is a specification.

My invention relates to that class of cooking utensils known as griddles, and is particularly adapted to be used for the frying of food products which are cylindrical in form, and is designed to be an improvement on my invention for the same purpose, an application for patent for which bearing Serial Number 330,631, was filed Oct. 14th 1919, in the United States Patent Office.

In the above mentioned application I have shown and described a utensil adapted for the frying of food products of a cylindrical nature, the mechanism being so arranged that the cylindrical food products could be shifted from time to time, so that their entire peripheral surface as well as their end surfaces would be progressively presented to the heated surface of the gridlle to produce a finished product having a uniformly cooked surface.

The object of my present invention is to provide an improved form of griddle adapted to perform all of the above mentioned functions, having certain new and useful details of construction and arrangement of parts, whereby it may be more conveniently handled, and the parts readily disassembled, in order that they may be more thoroughly and expeditiously cleaned.

Other objects will appear in the following description, will be pointed out in the claims and will be embodied in the accompanying drawings, in which:

Figure 1 is a plan view of my improved griddle.

Fig. 2 is a vertical longitudinal section of the same, taken on the line 2—2 of Fig. 1, viewed in the direction indicated by the arrows.

Fig. 3 is a transverse section of the same, taken on the line 3—3 of Fig. 1.

Referring more specifically to the accompanying drawings, 5 represents a pan preferably of rectangular formation, composed of cast or sheet iron, and provided with the side walls 6 and 7, the end walls 8 and 9, and the bottom 10, the bottom 10 being adapted to rest upon the heated surface of a stove. An outwardly projecting handle 11 is secured to the end wall 9 and is provided at its upper surface with a suitable guide groove 12, in which is adapted to slide a bar 13 which is provided with a handle 14 at its outer end, and an upstanding pin 15 at its inwardly projecting end.

A rectangular frame 16 having the side walls 17 and 18 and the end walls 19 and 20 composed of any suitable material, is mounted above the pan 5 and adapted to slide thereon, and in order that it may be conveniently guided with respect to pan 5, the side walls 17 and 18 project downwardly over the side walls 6 and 7 of said pan, and rest snugly against said walls. The end walls 19 and 20 of frame 16 are somewhat higher than the walls 17 and 18 in order that the heat may be prevented from radiating onto the hand of the operator, as well as to direct the same onto the food products to be fried.

The end wall 20 of frame 16 is provided with an outwardly extending ear 22 having a perforation 23 therein adapted to engage over pin 15 on bar 13. By the above recited construction it will be obvious that by moving the bar 13 by means of handle 14, the frame 16 may be readily reciprocated over the top of pan 5.

The side walls 17 and 18 of frame 16 are provided with oppositely disposed slots 25, which are open at the top edges of said sides and extend downwardly a suitable distance.

The cylindrical food products 26 are each adapted to be pierced by suitable spindles 27 to form an axis therefor. The ends of spindles 27 project beyond the outer ends of foods products 26, and are adapted to rest in slots 25, as clearly shown. The spindles 27 are pointed at one of their ends in order that the food products may be more readily pierced and are provided at their opposite ends with round disk like heads 30, adapted to project into a trough 31 formed on the side 17 of frame 16. By this arrangement it will be seen that a food product may be readily pierced by a spindle 27 and inserted into the slot 25 formed in the side walls of frame 16, and that by reason of the head 30 projecting into groove 31, the food product will be prevented from longitudinal movement with respect to said frame and pan 5, thus preventing contact of the ends of the food product with the side walls of said pan, in order that they may not become burned, but may be held in properly spaced relation with respect to the walls 6 and 7 and 17 and 18, in order that they may be evenly cooked.

In utilizing my utensil the uncooked food product is first properly placed on spindles 27 and then inserted into the slots 25, said slots being sufficiently deep to allow the peripheral surface of said food product to contact with the bottom 10, of pan 5. Pan 5 is then placed over a suitable heating unit and the handle 14 is manipulated gradually to roll the food product on the bottom 10 of pan 5, said food product being caused to revolve by frictional contact with the bottom of said pan. By this arrangement it is obvious that the entire peripheral surface of the food product may be fried uniformly as well as the contents and ends thereof.

By constructing the griddle in the manner described it is obvious that when it is desired to clean the various parts, the frame 16 may be readily lifted off from the pan 5 and that bar 13 may be readily removed from the groove in handle 11. Thus it will be seen that all of the members may be readily and thoroughly cleaned.

What I claim is:

1. A griddle construction, comprising a stationary member adapted to rest over a heating unit, a slidable member mounted on said stationary member, means for supporting a cylindrical food product for rotation in said slidable member so that its peripheral surface will contact with said stationary member, and means for reciprocating said slidable member.

2. A griddle construction, comprising a pair of members adapted for respective reciprocation, means for supporting a cylindrical food product for rotation in one of said members so that its peripheral surface will contact with the surface of the other member, means for respectively reciprocating said member, and means for preventing longitudinal movement of said food product with respect to said members.

3. A griddle construction, comprising a stationary member, a slidable member mounted on and adapted to be guided on said stationary member provided with oppositely disposed slots, an outwardly projecting handle secured to said stationary member provided with a guideway and a second slidable member secured to said first mentioned slidable member mounted in said guideway.

4. A griddle construction, comprising a stationary member, a slidable member mounted on said stationary member provided with oppositely disposed slots, an outwardly projecting handle secured to said stationary member provided with a guideway and a member adapted to be detachably secured to said sliding member mounted in said guideway.

5. A griddle construction, comprising a pair of members adapted for sliding relation with respect to each other, one of said members being provided with oppositely disposed slots in its side walls and a trough arranged adjacent one of its side walls opposite the slots therein, and a spindle provided with a head adapted to project into said trough for supporting a cylindrical food product.

6. A device for cooking articles of food comprising a griddle, and means for moving the articles of food being cooked over said griddle in contact therewith, said means being reciprocatively mounted with respect to said griddle and spaced therefrom.

7. In combination with a heated surface for cooking articles of food in contact therewith, and reciprocating means movable with respect to said heated surface for continually rolling said articles of food during the cooking operation.

In witness that I claim the foregoing I have hereunto subscribed my name this 23rd day of January, 1920.

FRANCIS J. T. O'BRIEN.

Witness:
A. S. McKINNON.